United States Patent [19]

Kozono et al.

[11] Patent Number: 4,619,472
[45] Date of Patent: Oct. 28, 1986

[54] PIPE COUPLING

[75] Inventors: Haruo Kozono; Isao Arakawa, both of Kitakyushu, Japan

[73] Assignee: Nippon Steel Corporation, Tokyo, Japan

[21] Appl. No.: 729,971

[22] Filed: May 2, 1985

[51] Int. Cl.$^4$ ............................................. F16L 25/00
[52] U.S. Cl. .................................... 285/334; 285/333; 285/390
[58] Field of Search ............... 285/334, 333, 390, 355, 285/332.2, 332.3

[56] References Cited

U.S. PATENT DOCUMENTS 4,009,893 3/1977 Ghatton et al. ............... 285/334 X
4,377,302 3/1983 Kohyama et al. .................. 285/334

FOREIGN PATENT DOCUMENTS 45-18096  6/1970 Japan .
48-17125  3/1973 Japan .
57-186690 11/1982 Japan .
WO84/02947 8/1984 PCT Int'l Appl. ................. 285/334

Primary Examiner—Richard J. Scanlan, Jr.
Attorney, Agent, or Firm—Wenderoth Lind & Ponack

[57] ABSTRACT

A pipe coupling includes an inner tubular member cut with an external thread and an outer tubular member cut with an internal thread and posseses a sealing portion where the metal-to-metal contact of conical surfaces establishes a seal. The tip of the sealing portion of the inner tubular member is substantially not in contact with the tip of the outer tubular member. An external peripheral shoulder having an inversely conical surface is provided on the inner tubular member while an internal peripheral shoulder having a conical surface is provided on the outer tubular member. The two peripheral shoulders are firmly engaged with each other.

5 Claims, 4 Drawing Figures

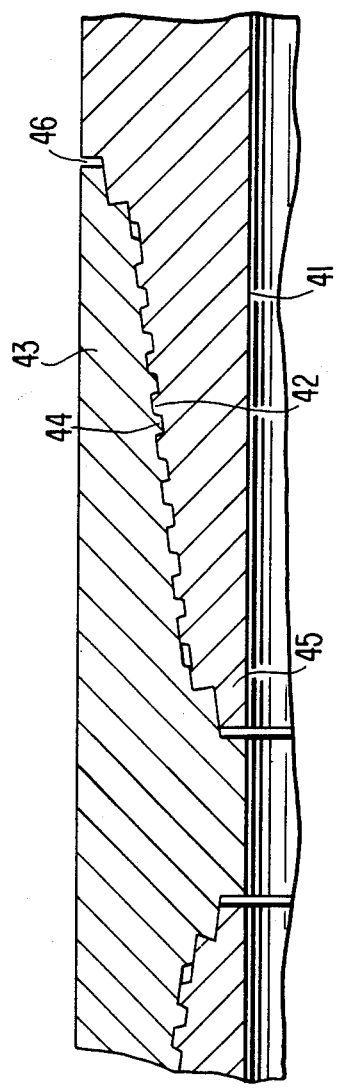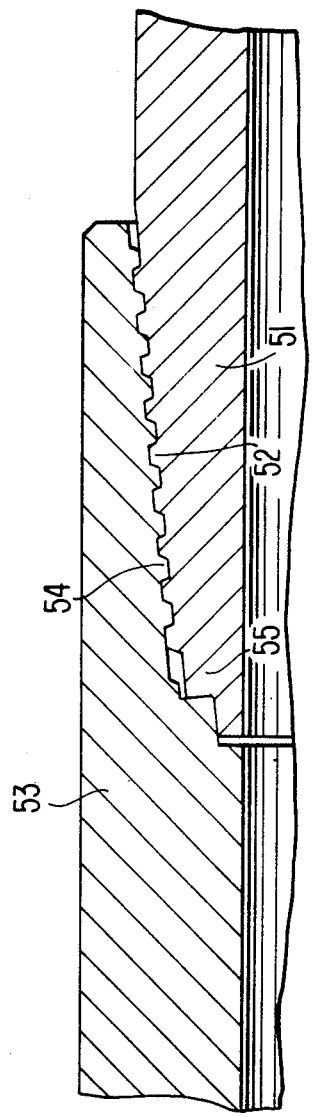

PIPE COUPLING

BACKGROUND OF THE INVENTION

1. Field of the Invention

This invention relates to a pipe coupling, and more particularly to a coupling for sealedly connecting metal pipes for use in the oil industry.

2. Description of the Prior Art

Many high-pressure oil wells at great depths have been developed in recent years. The oil-well pipes used in this type of oil wells call for couplings that surpass the API standards for threads (round and buttress) in such properties as tensile strength, airtightness, corrosion and erosion resistance. Of these properties, airtightness is particularly important. Leakage of inflammable gas may lead to a fire and explosion in an oil well and leakage of such poisonous gas as hydrogen sulfide may result in injury and death.

The airtightness of thread joints have conventionally been attained by minimizing the clearance thereat by specifying close machining tolerance, plating such soft malleable metal as tin on the threaded portion, and applying grease mixed with fine metal dust and calcium-lithium-based soap to fill the clearance left. The torque and the number of turns in screwing the pipes together must be carefully controlled, as well. Even if these measures are taken, gas leakage is difficult to prevent in the stringent environment involving high temperatures and pressures in which many oil wells are drilled recently unless the clearance between the external and internal threads is thoroughly eliminated. Thus, airtight joints of such special types as provide a metal-to-metal contact seal on pins (pipes to be connected) and a casing (coupling) or a Teflon ring in an annular groove cut in the threaded portion, have been in use.

Several variations are known for the former type. One example disclosed in the Gazette of Japanese Patent Publication No. 18096 of 1970 comprises a casing that has a peripheral shoulder provided with an inversely conical opening at each end. On the inner surface of the casing are provided a threaded portion and an unthreaded portion that extends between one end of the threaded portion and said shoulder. A pin (i.e., pipe) to be connected has a corresponding conical end having threaded and unthreaded portions on the outside thereof. When put together, the external thread on the conical surface of the pin and the internal thread of the inversely conical surface of the casing establish a metal-to-metal contact.

Another known example of a similar type comprises a casing that has a peripheral shoulder at each end which is provided with an inversely conical inner surface having a threaded portion and an unthreaded tapered tip portion. The inner surface of pins to be connected is shaped in the opposite way. With this coupling, a first seal is established by the contact between the conical and inversely conical surfaces, as in the case of the preceding example. In addition, a second seal is built up by the metal-to-metal contact between the expanded portions provided on the inclined surfaces of the pin and casing (see the Official Gazette Publication of Japanese Provisional Patent Publication No. 17125 of 1973).

Still another example disclosed in the Official Gazette of Japanese Provisional Patent Publication No. 113885 of 1981 has two peripheral shoulders with an inversely conical surface at the end thereof and near the threaded portion thereon. The inner surface of the pins to be connected thereby is shaped substantially in the opposite manner.

The conventional couplings described above can be categorized as the type in which the tip of a pin contacts the peripheral shoulder of a casing. The contact surface is inclined at a certain angle (approximately 75 degrees) with respect to the center axis of the pipes connected.

As such, most of thrust obtained by exerting torque on the threaded portions is absorbed at the tip. Besides, the yield point, which may be assumed as 63 kg/mm$^2$, is too small as compared with the modulus of elasticity which may be estimated as 21,000 kg/mm$^2$. As such, the amount of axial interference that may occur when compressed to the limit of elasticity will be not more than a few microns at the most.

Even if a high surface pressure may be obtained, no significant amount of deformation induced by the machining error and tensile force in the axial direction will be absorbed.

All of the conical-surface sealing methods described above share a common fundamental problem that the interference between the conical sealing surfaces will produce a reaction force that forces the pin and casing to shift radially away from each other. This will cause the tip portion to deform in a unique manner. Then, when subjected to an axial force or pressure exerted from the inside or outside, the conical sealing surfaces of the pin and casing may develop a relative radial displacement.

Another variation disclosed in the Official Gazzette Publication of Japanese Provisional Patent Publication No. 186,690 of 1982 differs from those described above in that the taper of the conical sealing surfaces is as gentle as approximately 1/10 and that the tip of the pin substantially does not come in contact with the peripheral shoulder of the casing.

With this type of coupling, the amount of interference need not be greater than approximately 1/10 of the displacement induced by the machining error and tensile force in the axial direction. Owing to the wedge effect of the conical outer surface of an elastic member, high pressure can be obtained at the sealing surface with extremely low stress.

In the aforementioned pin-and-casing contact type, the contacting portion at the tip offsets the wedge effect to the gently tapered sealing portion.

SUMMARY OF THE INVENTION

The object of this invention is to make the most of the type of joint in which the tip of the pin substantially does not come in contact with the peripheral shoulder of the casing in the conical sealing portion, to take advantage of the conical contact surface sealing type while reducing to a minimum the risk of the threaded portions from disconnecting, and to prevent the relative radial displacement of the sealed surfaces under various axial forces and, internally and externally exerted pressures.

A pipe coupling according to this invention comprises an inner tubular member cut with a tapered external thread and an outer tubular member cut with a tapered internal thread which establish a seal by the metal-to-metal contact of conical surfaces. The tip of the male side substantially does not come in contact with the female side. Between the threaded portion and the conical sealing surface, there is provided an external peripheral shoulder having a conical surface on the inner tubular member and an internal peripheral shoulder having an inversely conical surface on the outer tubular member. Both peripheral shoulders are closely engaged with each other.

With the pipe coupling of this invention, sealing can be achieved with a small force without weakening the elasticity of the long conical cylinder owing to the wedge effect of the conical sealing portion since the tip of the pin substantially does not come in contact with the casing. Besides, the peripheral shoulders provided in the heavier-wall portions prevent the disconnection of the threaded portions and the relative displacement of the sealing surfaces.

BRIEF DESCRIPTION OF THE DRAWINGS

FIG. 3 shows a pipe coupling having two sealing portion which is another preferred embodiment of this invention; and FIG. 4 shows a pipe coupling of the integral type which is still another preferred embodiment of this invention.

DESCRIPTION OF THE PREFERRED EMBODIMENT

Figure 1:
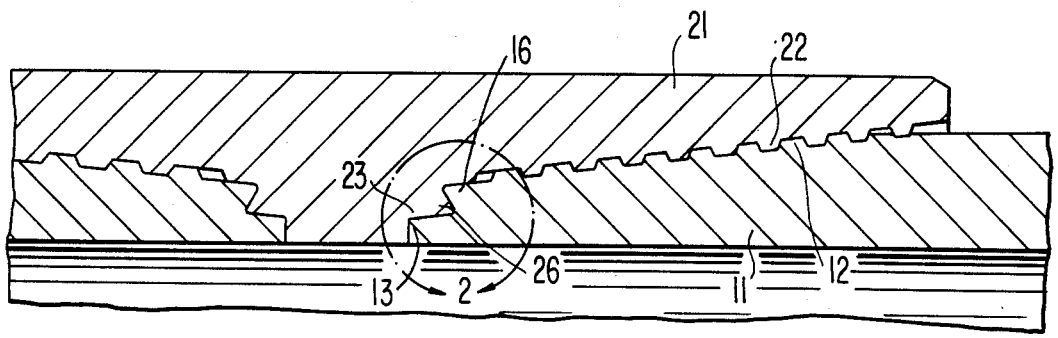
FIG. 1 shows a pipe coupling comprising a pin and a casing which embodies the principle of this invention.

Now details of this invention will be described by reference to the preferred embodiment shown in the drawings.

A pipe coupling according to this invention comprises a pin 11 and a casing 21.

Figure 2:
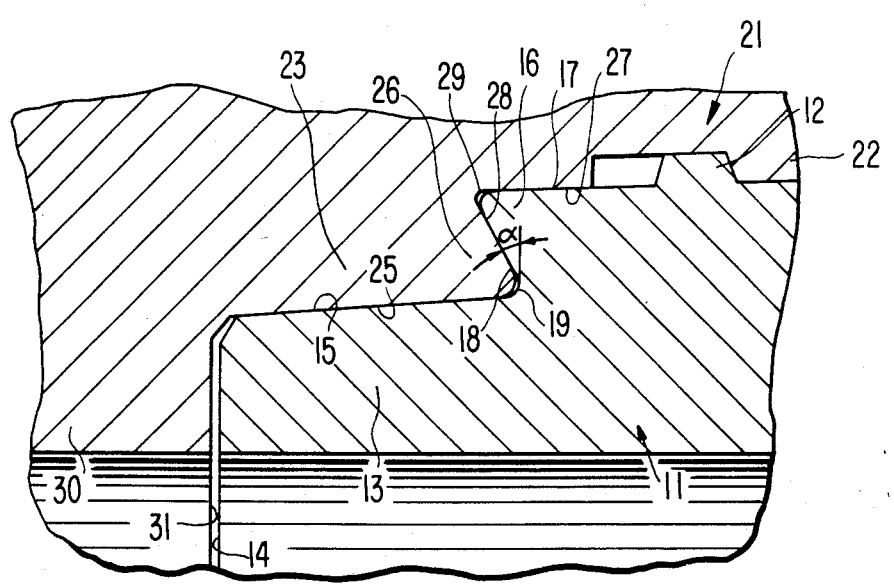
FIG. 2 is an enlarged view of the circled portion of the pipe coupling shown in FIG. 1.

The pin 11 has an external tapered thread 12 cut on the outer surface thereof, with the tip thereof forming an external sealing portion 13 that is cylindrical and tapering forward. The taper of the external sealing portion 13, that is, the inclination of the external surface thereof with respect to the axis of the pipe, or otherwise stated, the amount of decrease in the external radius thereof per unit distance therealong from right to left in FIG. 2, is ⅛ to 1/12, preferably 1/10. There is a surface perpendicular to the axis of the pipes to be connected at the tip of the external sealing portion. An external peripheral shoulder 16 is provided between the external thread 12 and the external sealing portion 13. The external peripheral shoulder 16 is triangular in cross section and has an unthreaded surface 17 leading to the external thread 12 and an inversely conical surface 18. A V-shaped annular groove 19 is formed between the sealing surface 15 and the inversely conical surface 18. The angle of inclination α of the inversely conical surface 18 with respect to a plane normal to the pipe axis is 12 degrees to 18 degrees, preferably 15 degrees, in view of the limit to which the external peripheral shoulder 16 is allowed to get axially distorted when the pin is screwed in and the dimensional tolerance of the external sealing portion 13.

The casing 21 has an internal thread 22 from each end thereof toward a projection 30 at the center. The end surface of the central projection 30 is perpendicular to the axis of the pipes to be connected. The sealing surface 25 of an internal sealing portion 23, which tightly fits in the external sealing portion 13, extends from said end surface 31 to the end of the casing 21. An internal peripheral shoulder 26 is provided between the internal thread 22 and internal sealing portion 23. The internal peripheral shoulder 26 comprises a conical surface 28 which extends rearward from the tip of an unthreaded surface 27 leading to the internal thread 22, to and the rear end of the sealing surface 25 of said internal sealing portion 23. The cross-sectional shape of the internal peripheral shoulder is triangular. A V-shaped annular groove 29 is formed between the unthreaded surface 27 and the conical surface 28.

Pipes are connected by screwing in the casing 21 into the pin 11. Then, the tip 14 of the external sealing portion 13 is substantially out of contact with the end surface 31 of the central projection 30 in the casing 21. The external peripheral shoulder 16 and the internal peripheral shoulder 26 fit tightly in the V-shaped grooves 29 and 19, respectively.

Now the operation of the pipe coupling according to this invention will be described. The strength needed for the connection of the pin 11 and casing 21 is provided mainly by the threaded portions 12 and 22, while the sealing function is performed by the conical sealing portions 13 and 23. The sealing surfaces 15 and 25 of the sealing portions 13 and 23 are tapered gently. The end surface 14 of the external sealing portion 13 is free and unrestricted. Therefore, great pressure is established at the sealing surfaces even if the torque with which the pin 11 is screwed in the casing 21 or the thrust resulting from the screwing action is small, whereby ensuring an effective sealing.

Closely fit in the V-shaped grooves 29 and 19 in the casing 21 and pin 11 respectively, the external and internal peripheral shoulders 16 and 26 push each other. As a result, the internal peripheral shoulder 26 is pressed hard against the sealing surface 15 of the sealing portion 13 on the pin 11, by the wedge action. This prevents the loosening of the threads 12 and 22 on the pin 11 and casing 21 and the radial deformation of the sealing portions 13 and 23 due to the pressure of the fluid passing through the pipes or other external forces applied thereon.

FIG. 3 shows another embodiment of this invention is which sealing portions 45 and 46 are provided on both sides of the threaded portions 42 and 44 of a pin 41 and casing 43. The structure of the circled sealing portions 45 and 46 is analogous to that shown in FIG. 2. This preferred embodiment seals the connected joint more tightly with the two sealing portions 45 and 46 than the first embodiment described above.

FIG. 4 shows still another embodiment of this invention which is a pipe coupling of the integral type. One of the pipes to be connected is provided with a coupling portion 51 cut with an external thread 52 while the other is cut with a coupling portion 53 cut with an internal thread 54. A sealing portion 55, which is circled, has the same structure as that shown in FIG. 2. Sealing may also be provided in two places, as with the embodiment shown in FIG. 3.

This invention is not limited to the preferred embodiments described above. Obviously, for example, the sealing portion can achieve the same results even if it is cut with a parallel thread instead of a tapered thread.

What is claimed is:

1. A pipe coupling, comprising:
   an inner tubular member having
      a cylindrical externally threadless external sealing portion terminating in a substantially free tip, said external sealing portion being tapered in a forward direction toward said tip, external thread rearward of said external sealing portion, and a threadless external peripheral shoulder, triangular in cross section, between said external thread and said external sealing portion, the exterior of said inner tubular member being threadless from said tip to said external thread, said external peripheral shoulder including a first unthreaded surface leading rearwardly to said external thread, and an inversely conical surface leading from said first unthreaded surface to an external sealing surface of said external sealing portion, defining an annular V-shaped groove between said external sealing surface and said inversely conical surface; and an outer tubular member having a threadless internal sealing portion fitted tightly on said external sealing portion, internal thread rearward of said internal sealing portion, threadedly engaging said external thread, and a threadless internal peripheral shoulder, triangular in cross section, between said internal thread and said internal sealing portion, the interior of said outer tubular member being threadless from said internal sealing portion to said internal thread, said internal peripheral shoulder including a second unthreaded surface leading rearwardly to said internal thread and a conical surface extending in a rearward and radially inward direction from a forward end of said second unthreaded surface to a rearward end of an internal sealing surface of said internal sealing portion so as to define an annular V-shaped groove between said second unthreaded surface and said conical surface, such that said external and internal peripheral shoulders respectively tightly fit in the V-shaped grooves of said inner and outer tubular members, whereby said external sealing portion is free of axial stress.

2. A pipe coupling according to claim 1 in which said external and internal sealing portions have a common central axis and a taper of ⅛ to 1/12 and said conical and inversely conical surfaces have an inclination of 12 degrees to 18 degrees with respect to a plane perpendicular to said central axis.

3. A pipe coupling according to claim 1, wherein said external and internal peripheral shoulders are provided respectively adjacent said external and internal thread.

4. A pipe coupling, comprising:

an external coupling member provided on one of two pipes to be connected and an internal coupling member provided on the other pipe;

said internal coupling member having a cylindrical externally threadless external sealing portion terminating in a substantially free tip, said external sealing portion being tapered in a forward direction toward said tip, an externally threaded portion rearward of said external sealing portion, said externally threaded portion being tapered in said forward direction, and a threadless external peripheral shoulder, triangular in cross section, between said externally threaded portion and said external sealing portion, the exterior of said internal coupling member being threadless from said tip to said externally threaded portion, said external peripheral shoulder including a first unthreaded surface leading rearwardly to said externally threaded portion, and an inversely conical surface leading from said first unthreaded surface to an external sealing surface of said external sealing portion, defining an annular V-shaped groove between said external sealing surface and said inversely conical surface; and an external coupling member having a threadless internal sealing portion fitted tightly on said external sealing portion, an internally threaded portion rearward of said internal sealing portion, threadedly engaging said externally threaded portion, and a threadless internal peripheral shoulder, triangular in cross section, between said internally threaded portion and said internal sealing portion, the interior of said external coupling member being threadless from said internal sealing portion to said internally threaded portion, said internal peripheral shoulder including a second unthreaded surface leading rearwardly to said internally threaded portion and a conical surface extending in a rearward and radially inward direction from a forward end of said second unthreaded surface to a rearward end of an internal sealing surface of said internal sealing portion so as to define an annular V-shaped groove between said second unthreaded surface and said conical surface, such that said external and internal peripheral shoulders respectively tightly fit in the V-shaped grooves of said internal and external coupling members, whereby said external sealing portion is free of axial stress.

5. A pipe coupling according to claim 4 in which said external and internal sealing portions have a common central axis and a taper of ⅛ to 1/12 and said conical and inversely conical surfaces have an inclination of 12 degrees to 18 degrees with respect to a plane perpendicular to said central axis.

* * * * *